United States Patent
Joza et al.

(10) Patent No.: US 10,377,099 B2
(45) Date of Patent: Aug. 13, 2019

(54) PNEUMATIC TIRE WITH SURFACE FASTENER AND METHOD OF MANUFACTURING SAME

(71) Applicant: The Yokohama Rubber Co., LTD., Minato-ku, Tokyo (JP)

(72) Inventors: Ayako Joza, Hiratsuka (JP); Atsushi Tanno, Hiratsuka (JP); Shiro Ogawa, Osaka (JP); Akira Fujita, Fuwa-gun Gifu (JP)

(73) Assignee: The Yokohama Rubber Co., LTD. (JP)

( * ) Notice: Subject to any disclaimer, the term of this patent is extended or adjusted under 35 U.S.C. 154(b) by 66 days.

(21) Appl. No.: 14/650,275

(22) PCT Filed: Dec. 5, 2013

(86) PCT No.: PCT/JP2013/082693
§ 371 (c)(1),
(2) Date: Jun. 5, 2015

(87) PCT Pub. No.: WO2014/088064
PCT Pub. Date: Jun. 12, 2014

(65) Prior Publication Data
US 2015/0306831 A1    Oct. 29, 2015

(30) Foreign Application Priority Data
Dec. 5, 2012    (JP) ................. 2012-266145

(51) Int. Cl.
*B29D 30/06*    (2006.01)
*B29D 30/00*    (2006.01)
(Continued)

(52) U.S. Cl.
CPC ..... *B29D 30/0601* (2013.01); *B29D 30/0061* (2013.01); *B60C 5/00* (2013.01);
(Continued)

(58) Field of Classification Search
CPC ........ B29D 30/0061; B29D 2030/0072; B29D 2030/0077; B29D 2030/0083; B60C 19/002; A44B 18/0076
See application file for complete search history.

(56) References Cited

U.S. PATENT DOCUMENTS

| | | | |
|---|---|---|---|
| 5,500,268 A * | 3/1996 | Billarant | A44B 18/0076 24/442 |
| 5,715,581 A | 2/1998 | Akeno | |

(Continued)

FOREIGN PATENT DOCUMENTS

| | | |
|---|---|---|
| CN | 101462473 | 6/2009 |
| CN | 101668626 | 3/2010 |

(Continued)

OTHER PUBLICATIONS

Machine generated English language translation of TW 201111148 (original document dated Apr. 2011).*

(Continued)

*Primary Examiner* — Robert C Dye
*Assistant Examiner* — Cedrick S Williams
(74) *Attorney, Agent, or Firm* — Thorpe North & Western (57) ABSTRACT

A method of manufacturing a pneumatic tire with surface fastener according to the present technology includes, while engaging a surface fastener provided with a plurality of first engaging elements and a sheet-shaped protective member provided with a plurality of second engaging elements that engage with the first engaging elements of the surface fastener, disposing the surface fastener in an unvulcanized tire so that a surface on a side opposite that of a surface on which the engaging elements are provided is closely fitted to an inner surface of the tire, and vulcanizing the unvulcanized tire provided with the surface fastener using a vulcanizer equipped with a vulcanization bladder.

9 Claims, 9 Drawing Sheets

(51) Int. Cl.
 B60C 19/00 (2006.01)
 B60C 23/04 (2006.01)
 B60C 5/00 (2006.01)
(52) U.S. Cl.
 CPC ............ *B60C 19/00* (2013.01); *B60C 19/002* (2013.01); *B60C 23/0493* (2013.01); *B29D 2030/0072* (2013.01)

(56) References Cited

U.S. PATENT DOCUMENTS

| | | | | |
|---|---|---|---|---|
| 5,922,436 | A * | 7/1999 | Banfield | A44B 18/0049 24/306 |
| 5,961,761 | A * | 10/1999 | Heindel | A61F 13/15756 156/163 |
| 6,430,786 | B1 * | 8/2002 | Ikeda | A44B 17/0029 24/104 |
| 7,927,681 | B2 * | 4/2011 | Cheng | A47C 31/023 428/100 |
| 8,444,795 | B2 * | 5/2013 | Tanno | B29D 30/0061 156/110.1 |
| 8,945,322 | B2 * | 2/2015 | Tanno | B29D 30/0061 152/450 |
| 2002/0023322 | A1 | 2/2002 | Murasaki | |
| 2004/0103967 | A1 * | 6/2004 | Majumdar | B29D 30/0662 152/450 |
| 2009/0151837 | A1 | 6/2009 | Uhlenbruch | |
| 2009/0159172 | A1 * | 6/2009 | Tanno | B29D 30/0061 152/548 |
| 2010/0018622 | A1 * | 1/2010 | Tanno | B29D 30/0061 152/510 |
| 2010/0230024 | A1 | 9/2010 | Borot et al. | |
| 2010/0249744 | A1 * | 9/2010 | Akiyama | A61F 13/622 604/391 |
| 2010/0276048 | A1 * | 11/2010 | Adamson | B29D 30/0061 152/450 |
| 2011/0189423 | A1 * | 8/2011 | Townsend | A44B 18/0065 428/58 |
| 2011/0290395 | A1 * | 12/2011 | Tanno | B29D 30/0061 152/450 |
| 2012/0000588 | A1 * | 1/2012 | Tanno | B29D 30/0061 152/450 |

FOREIGN PATENT DOCUMENTS

| | | | | |
|---|---|---|---|---|
| EP | 2 135 750 | | 12/2009 | |
| JP | 62-144911 | * | 6/1987 | ............ B29C 39/10 |
| JP | 06-225805 | * | 8/1994 | ............ A44B 18/00 |
| JP | H0884611 | | 4/1996 | |
| JP | 2002078512 | | 3/2002 | |
| JP | 2006-44503 | * | 2/2006 | ............... B60C 5/00 |
| JP | 2006044503 | | 2/2006 | |
| JP | 2008272954 | | 11/2008 | |
| JP | 2010534161 | | 11/2010 | |
| JP | 2012011986 | | 1/2012 | |
| KR | 10-2006-0101 | * | 8/2008 | ............. B29C 51/12 |
| TW | 201111148 | * | 4/2011 | ............. B29C 45/14 |
| WO | WO2008133093 | | 11/2008 | |
| WO | WO2009013269 | | 1/2009 | |

OTHER PUBLICATIONS

English language Abstract for TW 201111148 (original document dated Apr. 2011).*
Machine generated English language translation of JP 2006-44503 (original document dated Feb. 2006).*
Machine generated English language translation of KR 10-2006-0101762 (original document dated Aug. 2008).*
Machine generated English language translation of JP 06-225805 (original document dated Aug. 1994).*
Machine generated English language translation of JP 62-144911 (original document dated Jun. 1987).*
. Ri International Search Report for International Application No. PCT/JP2013/082693 dated Feb. 4, 2014, 4 pages, Japan.

* cited by examiner

PNEUMATIC TIRE WITH SURFACE FASTENER AND METHOD OF MANUFACTURING SAME

TECHNICAL FIELD

The present technology relates to a pneumatic tire with surface fastener allowing for easier mounting of accessories such as noise absorbing members and to a method of manufacturing the same, and, more specifically, to a pneumatic tire with surface fastener in which crushing of engaging elements of the surface fastener during vulcanization is prevented and to a method of manufacturing the same.

BACKGROUND

A pneumatic tire provided with a surface fastener on an inner surface of the tire in order to facilitate mounting of accessories such as noise absorbing members has been proposed (see, for example, Japanese Unexamined Patent Application Publication No. 2006-044503A). In pneumatic tires, noise absorbing members are provided in a cavity portion in order to reduce resonance generated in the cavity portion; the abovementioned pneumatic tire with surface fastener allows for easy mounting and removal of accessories such as noise absorbing members as necessary.

However, when an unvulcanized tire provided with a surface fastener on the inner surface of the tire is molded and a typical vulcanizer equipped with a vulcanization bladder is used to vulcanize the unvulcanized tire with surface fastener, the pressure exerted by the vulcanization bladder during vulcanization may crush the engaging elements of the surface fastener. When the engaging elements are crushed, the problem arises that the mounting state of the accessories such as noise absorbing members becomes unstable, and, in some instances, the accessories cannot be mounted.

In view of such drawbacks, an arrangement has been proposed in which the spaces between the engaging elements of the surface fastener are filled with unvulcanized rubber to form a protective rubber layer in which the engaging elements are embedded, and the protective rubber layer prevents the engaging elements of the surface fastener from being crushed during vulcanization (see, for example, Japanese Unexamined Patent Application Publication No. 2008-272954A).

However, it is necessary to press a heated and softened unvulcanized rubber sheet against the surface fastener in order to fill the spaces between the engaging elements of the surface fastener with unvulcanized rubber, and the engaging elements may undergo plastic deformation during laminating at such high temperatures. As a result, the protective rubber layer described above cannot be considered sufficiently effective in preventing crushing of the engaging elements of the surface fastener.

SUMMARY

The present technology provides a pneumatic tire with surface fastener in which crushing of engaging elements of the surface fastener during vulcanization is prevented, as well as a method of manufacturing the same.

A method of manufacturing a pneumatic tire with surface fastener according to the present technology includes, while engaging a surface fastener provided with a plurality of first engaging elements and a sheet-shaped protective member provided with a plurality of second engaging elements that engage with the first engaging elements of the surface fastener, disposing the surface fastener in an unvulcanized tire so that a surface on a side opposite that of the surface on which the engaging elements are provided is closely fitted to an inner surface of the tire, and vulcanizing the unvulcanized tire with surface fastener using a vulcanizer equipped with a vulcanization bladder.

In the present technology, a sheet-shaped protective member provided with second engaging elements that engage with the first engaging elements of the surface fastener is laminated over the surface fastener when vulcanizing the unvulcanized tire with surface fastener with the vulcanizer equipped with the vulcanization bladder, thereby allowing crushing of the first engaging elements of the surface fastener due to the pressure of the vulcanization bladder during vulcanization to be prevented. In other words, by virtue of the experimental results obtained by the inventors, the first engaging elements of the surface fastener disposed on the inner surface of the tire are effectively protected during vulcanization by the protective member while engaging with the second engaging elements of the protective member. Unlike a conventional protective rubber layer, the protective member provided with the second engaging elements offers the advantage of allowing for easy mounting to and removal from the surface fastener disposed on the inner surface of the tire without causing plastic deformation of the first engaging elements of the surface fastener when engaged with the surface fastener. Such a protective member can be peeled away from the surface fastener as necessary after the tire has been vulcanized. As a result, optional accessories such as noise absorbing members can be attached to the inner surface of the tire using the surface fastener.

In the present technology, it is preferable that the surface fastener is provided with a plurality of anchoring elements on a surface on a side opposite that of a surface on which the engaging elements are provided, and the anchoring elements are caused to dig into the inner surface of the tire when the surface fastener is disposed in the unvulcanized tire. It is thus possible to strongly hold the surface fastener to the inner surface of the tire.

When disposing the surface fastener in the unvulcanized tire while the surface fastener and the protective member are engaged, it is possible first to engage the surface fastener and the protective member, then dispose the surface fastener with protective member on the inner surface of the tire. In this case, the two members are handled as a single whole, allowing for reduced molding time of the tire. Alternatively, the protective member can be engaged with the surface fastener after the surface fastener has been disposed on the inner surface of the tire. In this case, the protective member can be more reliably engaged with the surface fastener while the tire is still in an unvulcanized state.

The post-vulcanization engagement force of the surface fastener and the protective member is preferably 20 g/cm to 400 g/cm. A minimum level of engagement force between the surface fastener and the protective member is necessary, but too great a level of engagement force will negatively affect workability when removing the protective member from the surface fastener, increasing the damage sustained by the surface fastener. For this reason, placing limits upon the abovementioned engagement force allows good workability to be maintained when removing the protective member from the surface fastener, and damage to the surface fastener to be prevented.

The first engaging elements of the surface fastener are preferably hooks. Specifically, in accordance with the present technology, disposing a surface fastener provided with hooks as first engaging elements on the inner surface of the tire allows crushing of the first engaging elements constituted by the hooks during vulcanization to be effectively prevented. Meanwhile, the protective member is preferably a woven fabric provided with fiber loops as second engaging elements, a knitted fabric provided with fiber loops as second engaging elements, or a nonwoven fabric provided with randomly oriented fibers as second engaging elements.

The relationship of the width W2 of the protective member to the width W1 of the surface fastener is preferably such that $0.3 \leq W2/W1 < 1.0$. In other words, the protective member is capable of demonstrating protective effects even when not disposed over the entire width of the surface fastener; rather, imparting the protective member with a width W2 that is less than the width W1 of the surface fastener makes it possible to prevent the protective member from sticking as a whole to the inner liner layer on the inner surface of the tire following the vulcanization step.

In accordance with the present technology, a pneumatic tire with surface fastener can be obtained according to the manufacturing method described above, the pneumatic tire with surface fastener being provided either with the protective member attached to the surface fastener or with the protective member removed from the surface fastener.

When the tire is shipped with the protective member attached to the surface fastener, the protective member can be left in place until immediately before accessories such as noise absorbing members are mounted to the surface fastener, thereby reliably preventing the adhesion of foreign matter such as stray threads to the surface fastener and allowing good engagement force on the part of the surface fastener to be maintained. However, it is also possible to ship the tire with the protective member removed from the surface fastener and accessories such as noise absorbing members mounted to the surface fastener.

DETAILED DESCRIPTION

Figure 1:
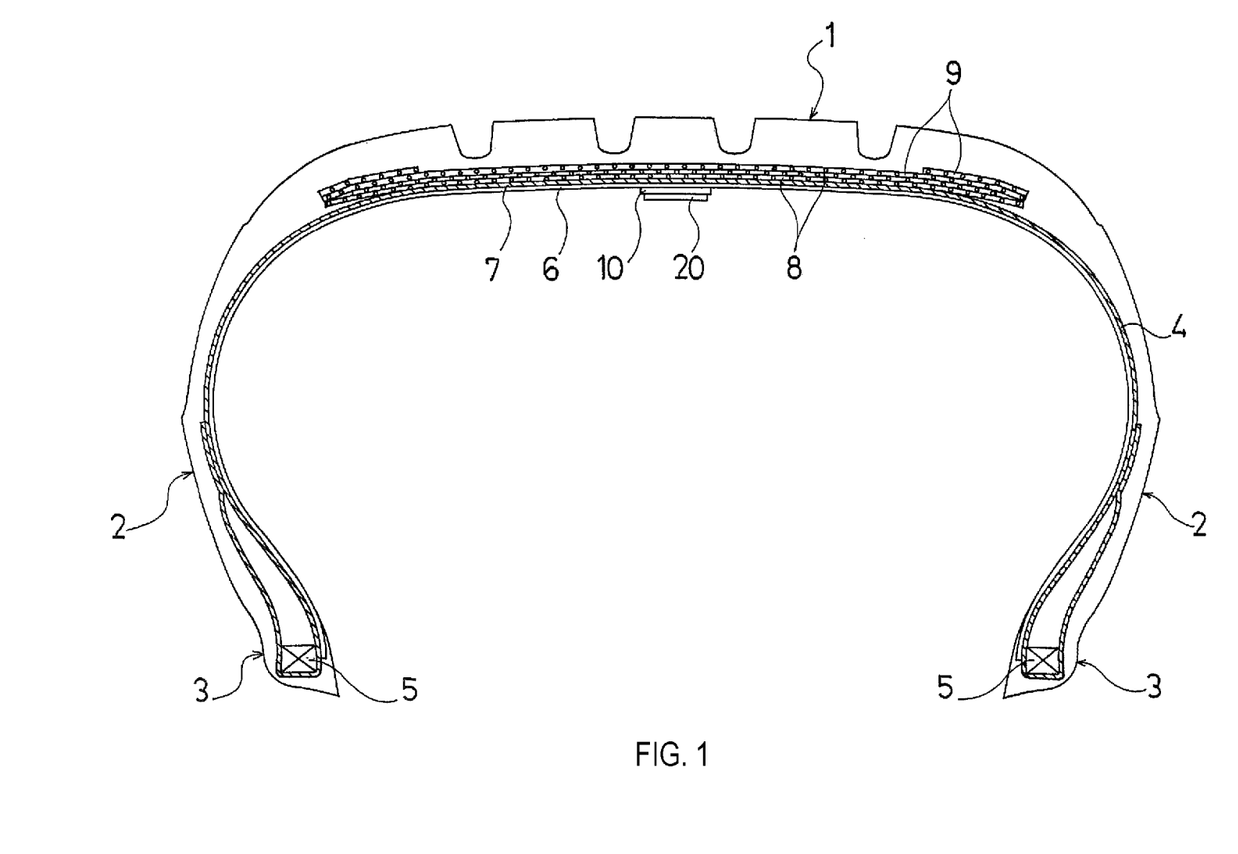
FIG. 1 is a meridian cross-sectional view illustrating a pneumatic tire with surface fastener according to an embodiment of the present technology.

The following is a detailed description of the configuration of the present technology with reference to the accompanying drawings. FIG. 1 illustrates a pneumatic tire with surface fastener according to an embodiment of the present technology. As illustrated in FIG. 1, the pneumatic tire with surface fastener according to the present embodiment is provided with an annular tread portion 1 extending in the circumferential direction of the tire, a pair of side wall portions 2 disposed on both sides of the tread portion 1, and a pair of bead portions 3 disposed to the inner side of the side wall portions 2 in the radial direction of the tire.

At least one carcass layer 4 is laid between the pair of bead portions 3,3. The carcass layer 4 includes a plurality of reinforcing cords oriented in the radial direction of the tire. The carcass layer 4 is wrapped back around a bead core 5 disposed in each of the bead portions 3 from the inside of the tire to the outside of the tire. Organic fiber cords are preferably used as the reinforcing cords of the carcass layer 4. An inner liner layer 7 is disposed on an inner surface 6 of the tire so as to conform to the carcass layer 4.

Meanwhile, a plurality of belt layers 8 is embedded to an outer circumferential side of the carcass layer 4 in the tread portion 1. The belt layers 8 include a plurality of reinforcing cords that are oblique with respect to the circumferential direction of the tire, and are disposed so that the reinforcing cords of different layers intersect each other. In the belt layers 8, the inclination angle of the reinforcing cords with respect to the circumferential direction of the tire is set in a range from, for example, 10° to 40°. Steel cords are preferably used as the reinforcing cords of the belt layers 8. For the purpose of enhancing high-speed durability, at least one belt cover layer 9 formed by arranging reinforcing cords at an angle of not greater than 5° with respect to the circumferential direction of the tire is disposed to the outer circumferential side of the belt layers 8. The belt cover layer 9 preferably has a jointless structure in which a strip material made from at least a single reinforcing cord laid in parallel and covered with rubber is wound continuously in the circumferential direction of the tire. The belt cover layer 9 can also be disposed so as to cover the belt layers 7 in the width direction at all positions, or so as to cover only the edge portions to the outer side of the belt layers 8 with respect to the width direction. Organic fiber cords are preferably used as the reinforcing cords of the belt cover layer 9.

The tire interior structure described above illustrates a typical example of a pneumatic tire, but the present technology is not limited thereto.

A surface fastener 10 and a sheet-shaped protective member 20 covering the surface fastener 10 are provided on the inner surface 4 of the tire in a central region of the tread portion 1 of the pneumatic tire. The surface fastener 10 and the protective member 20 may be disposed continuously over the entire circumference of the tire, or intermittently in the circumferential direction of the tire. The protective member 20 is able to be removed from the surface fastener 10. It is thus possible to mount optional accessories such as noise absorbing members, weights, temperature sensors, and pressure sensors on the surface fastener 10 while a the protective member 20 is removed to expose the surface fastener 10.

Figure 2:
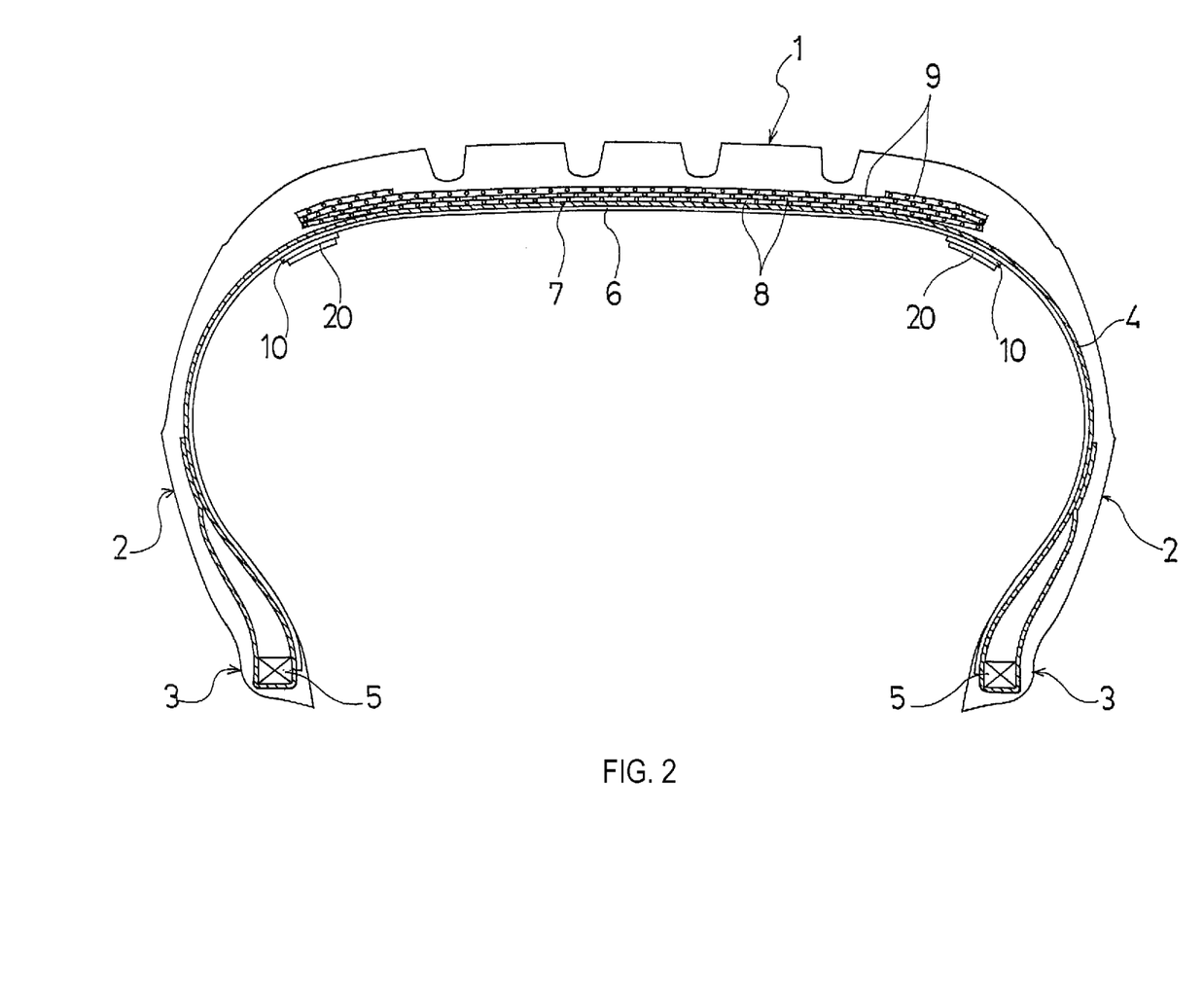
FIG. 2 is a meridian cross-sectional view illustrating a pneumatic tire with surface fastener according to another embodiment of the present technology.

The position of the surface fastener 10 is not limited to being in the central region of the tread portion 1; a shoulder region of the tread portion 1, as illustrated in FIG. 2, may be selected or the side wall portions 2 or bead portions 3 may also be selected.

Figure 3:
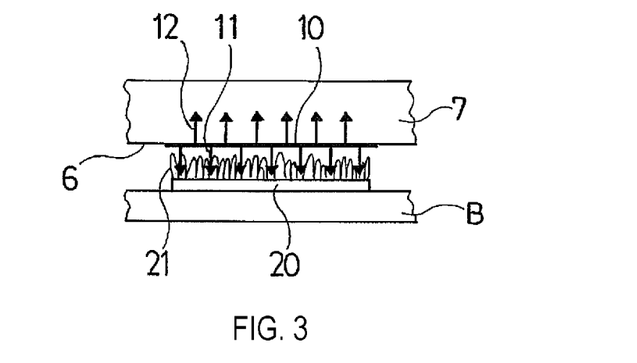
FIG. 3 is a magnified cross-sectional view of an example of a surface fastener and a protective member of a method of manufacturing a pneumatic tire with surface fastener according to the present technology.
Figure 4:
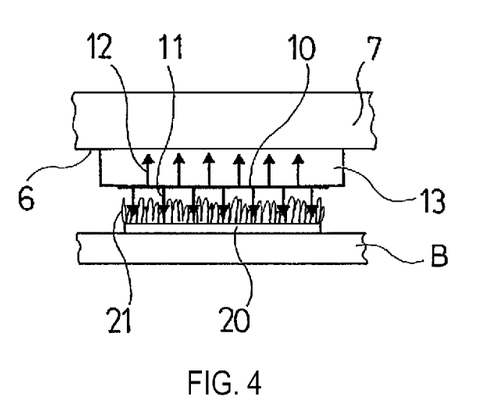
FIG. 4 is a magnified cross-sectional view of a modified example of a surface fastener and a protective member of the method of manufacturing a pneumatic tire with surface fastener according to the present technology.
Figure 5:
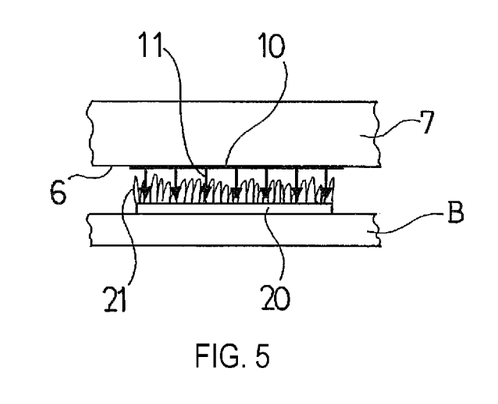
FIG. 5 is a magnified cross-sectional view of a modified example of a surface fastener and a protective member of the method of manufacturing a pneumatic tire with surface fastener according to the present technology.

Next, a method of manufacturing the pneumatic tire with surface fastener described above will be described. FIGS. 3 to 5 illustrate a method of manufacturing the pneumatic tire with surface fastener of the present technology. FIGS. 3 to 5 are tire meridian cross-sectional views of an extracted section of the circumferential section of the surface fastener.

FIG. 3 illustrates the surface fastener 10 attached to the inner surface 6 of the tire (i.e., the inner surface of the inner liner layer 7) and the protective member 20 being pressed together by a vulcanization bladder B. The surface fastener 10 is provided on one surface with a plurality of engaging elements 11 (first engaging elements). Meanwhile, the protective member 20 is provided with a plurality of engaging elements 21 (second engaging elements) that engage with the engaging elements 11 of the surface fastener 10.

When manufacturing the pneumatic tire described above, while the surface fastener 10 provided with the plurality of engaging elements 11 and the sheet-shaped protective member 20 provided with the plurality of engaging elements 21 that engage with the engaging elements 11 of the surface fastener 10 are engaged with each other, the surface fastener 10 is disposed in an unvulcanized tire so that a surface on a side opposite that of the surface on which the engaging elements are provided is closely fitted to the inner surface 6 of the tire, the unvulcanized tire provided with the surface fastener 10 is vulcanized using a vulcanizer provided with the vulcanization bladder B, and, simultaneously, the surface fastener 10 is bonded to the inner surface 6 of the tire via vulcanization.

When vulcanizing the unvulcanized tire provided with the surface fastener 10 using the vulcanizer provided with the vulcanization bladder B, the protective member 20 is laminated onto the surface fastener 10 according to the engagement force of the engaging elements 11, 21, allowing crushing of the engaging elements 11 of the surface fastener 10 due to the pressure of the vulcanization bladder B during vulcanization to be prevented.

When disposing the surface fastener 10 in the unvulcanized tire while the surface fastener 10 and the protective member 20 are engaged, it is possible to first engage the surface fastener 10 and the protective member 20, then dispose the surface fastener 10 with the protective member 20 on the inner surface 6 of the tire. This arrangement offers the advantage that, because the surface fastener 10 and the protective member 20 are handled as a single whole, the molding time of the tire can be reduced. However, because the surface fastener 10 and the protective member 20 are engaged ahead of time, the protective member 20 may become dislodged from the surface fastener 10 when the members are being transported or when the tire is being molded. Therefore it is preferable to confirm that the protective member 20 is engaged with the surface fastener 10 while the tire is still in an unvulcanized state.

Alternatively, the protective member 20 can be engaged with the surface fastener 10 after the surface fastener 10 has been disposed on the inner surface 6 of the tire. This arrangement offers the advantage that the protective member 20 can be more reliably engaged with the surface fastener 10 while the tire is still in an unvulcanized state. However, because there is an added step of attaching the protective member 20 apart from that of attaching the surface fastener 10, the molding time of the tire will be increased by that much.

The surface fastener 10 described above can be molded from a thermoplastic resin such as nylon, polyester, polyethylene, polypropylene, polyvinyl chloride, polystyrene, acrylonitrile/styrene, acrylonitrile/butadiene/styrene, or polyethylene terephthalate. Depending on the use of the tire, it is preferable to use a polyamide resin of superior adhesiveness or workability or a polyester resin of superior heat resistance. There is no particular limitation upon the shape and type of the surface fastener 10. The height of the engaging elements 11 is preferably at least 0.5 mm and less than 2 mm, as this will allow demonstration of good engagement force when mounting optional accessories.

In FIG. 3, the surface fastener 10 is provided with a plurality of engaging elements 11 on one surface and a plurality of anchoring elements 12 on the other surface. This arrangement allows to cause the anchoring elements 12 to dig into the inner surface 6 of the tire when the surface fastener 10 is being disposed in the unvulcanized tire. It is thus possible to strongly hold the surface fastener 10 to the inner surface 6 of the tire. The anchoring elements 12 preferably have enlarged portions at their tips, the enlarged portions preferably having a width of at least 0.3 mm and less than 1 mm. Imparting the enlarged portions of the anchoring elements 12 with a width of at least 0.3 mm enhances the anchoring effect, but the anchoring elements 12 has difficulty digging into the rubber if the enlarged portions are 1 mm or greater.

In FIG. 4, an adhesive rubber layer 13 has been extruded onto the other surface of the surface fastener 10 in advance so that the anchoring elements 12 are embedded therein. The surface fastener 10 can thus be more reliably anchored to the inner surface 6 of the tire by selecting a constituent material that exhibits superior adhesiveness to the inner liner layer 7 for the adhesive rubber layer 13.

In FIG. 5, anchoring elements 12 are not formed on the other surface of the surface fastener 10. The surface fastener 10 can be bonded to the inner surface 6 of the tire via vulcanization even without anchoring elements 12, as in this arrangement.

The post-vulcanization engagement force (peel strength) of the surface fastener 10 and the protective member 20 is preferably in a range from 20 g/cm to 400 g/cm, and more preferably 30 g/cm to 300 g/cm. This will maintain good workability when the protective member 20 is removed from the surface fastener 10, as well as allow damage to the surface fastener 10 when the protective member 20 is removed to be prevented. If the engagement force of the two is too small, the protective member 20 will more readily dislodge from the surface fastener 10 when the tire is vulcanized; conversely, if the engagement force is too great, workability when the protective member 20 is removed from the surface fastener 10 will be negatively affected, and there will be a risk of damage to the surface fastener 10 when the protective member 20 is removed therefrom. The engagement force (peel strength) is "debonding strength" as measured according to JIS-L 3416.

The engaging elements 11 of the surface fastener 10 are preferably hooks. By applying the protective member 20 described above, crushing of the engaging elements 11 constituted by hooks during vulcanization can be effectively prevented when the surface fastener 10 provided with the engaging elements 11 constituted by hooks is disposed on the inner surface 6 of the tire.

Figure 6:
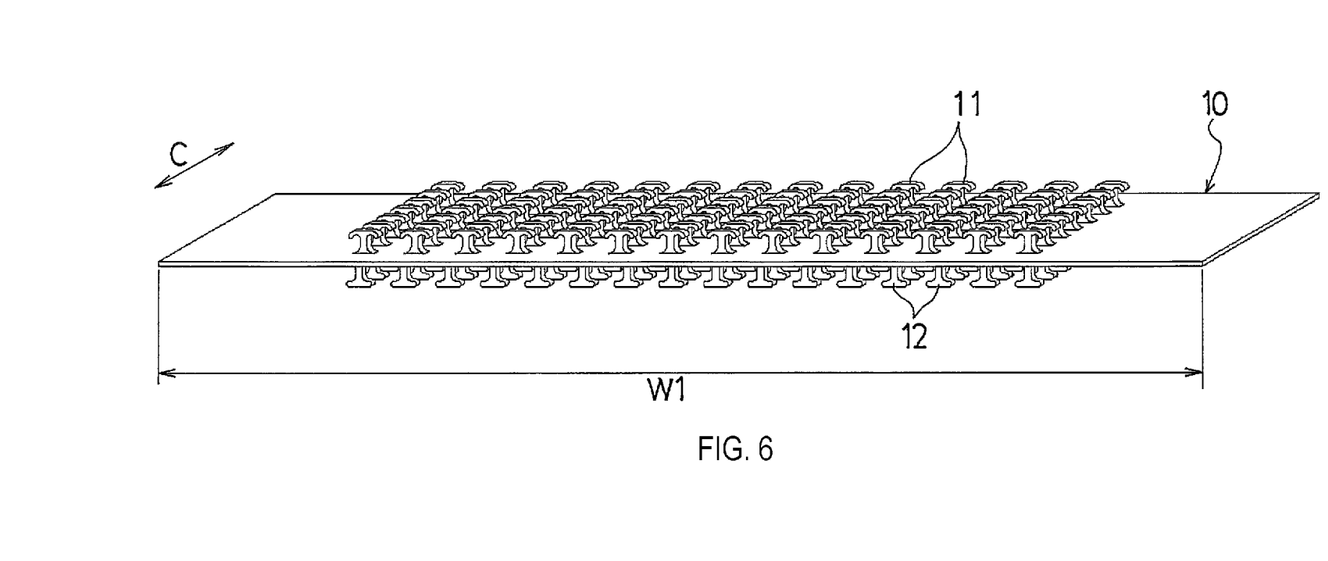
FIG. 6 is a perspective view of a specific example of a surface fastener used in the method of manufacturing a pneumatic tire with surface fastener according to the present technology.
Figure 7:
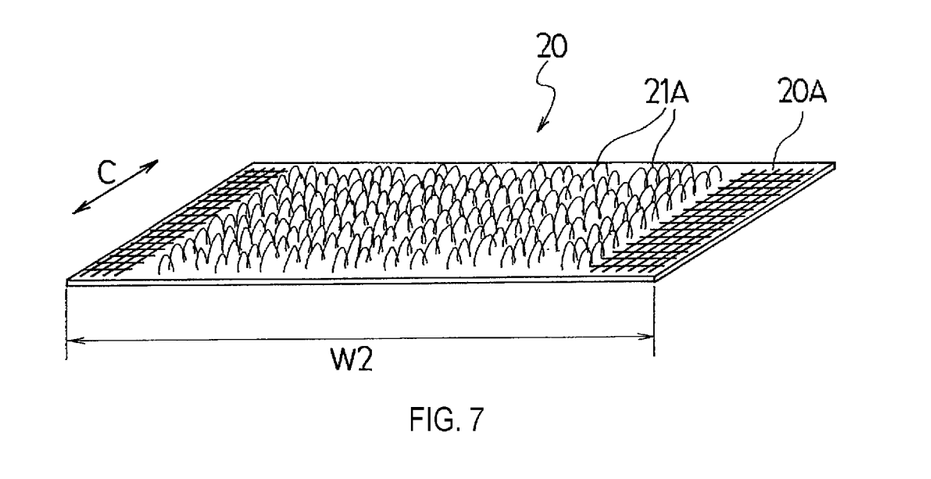
FIG. 7 is a perspective view of a specific example of a protective member used in the method of manufacturing a pneumatic tire with surface fastener according to the present technology.
Figure 8:
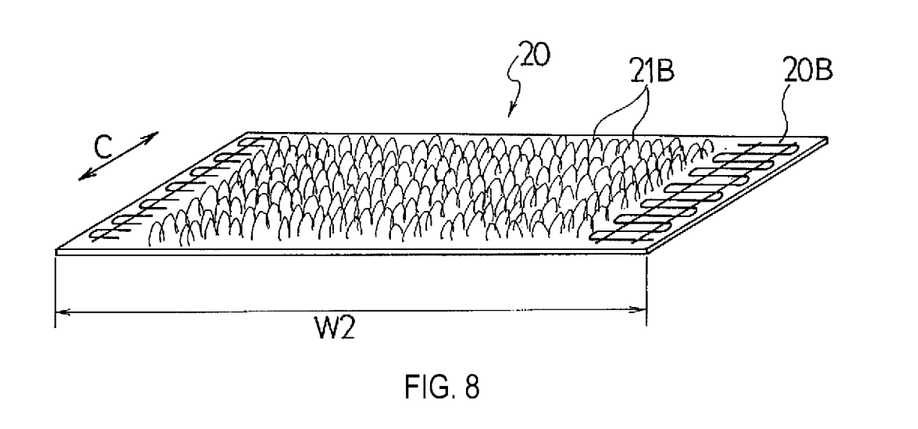
FIG. 8 is a perspective view of a specific example of a protective member used in the method of manufacturing a pneumatic tire with surface fastener according to the present technology.
Figure 9:
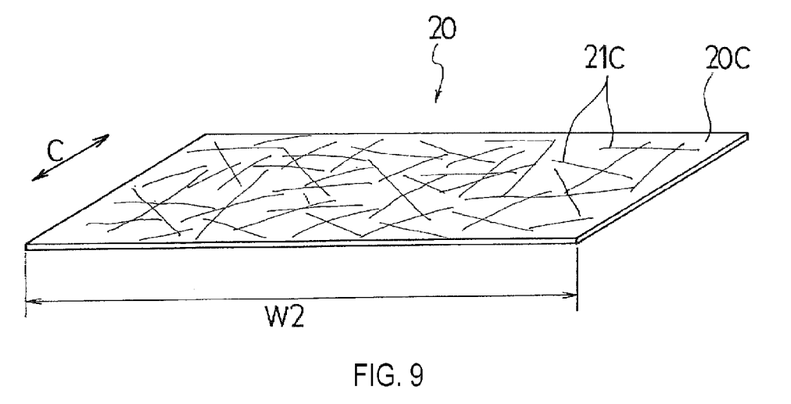
FIG. 9 is a perspective view of a specific example of a protective member used in the method of manufacturing a pneumatic tire with surface fastener according to the present technology.

FIG. 6 illustrates a specific example of a surface fastener used in the method of manufacturing a pneumatic tire with surface fastener according to the present technology, and FIGS. 7 to 9 illustrate specific examples of protective members used in the method of manufacturing a pneumatic tire with surface fastener according to the present technology. In FIGS. 6 to 9, C is the circumferential direction of the tire.

As illustrated in FIG. 6, a plurality of T-shaped engaging elements 11 is formed on one surface of the surface fastener 10, and a plurality of T-shaped anchoring elements 12 is formed on the other surface of the surface fastener 10. In FIG. 6, regions in which no engaging elements 11 are formed are provided at both ends of the surface fastener 10 with respect to the widthwise direction of the tire. This arrangement makes it easy to keep the protective member 20 from protruding beyond the surface fastener 10 even when the protective member 20 is laminated so as to cover all of the engaging elements 11, allowing the disadvantage of the protective member 20 sticking to the inner liner layer 7 on the inner surface 6 of the tire following vulcanization to be more reliably avoided. However, there does not need to be a region in which no engaging elements 11 are formed.

In FIG. 7, the protective member 20 is constituted by a woven fabric 20A provided with fiber loops 21A as engaging elements 21. In FIG. 8, the protective member 20 is constituted by a knitted fabric 20B provided with fiber loops 21B as engaging elements 21. In FIG. 9, the protective member 20 is constituted by a nonwoven fabric 20C provided with randomly oriented fibers 21C as engaging elements 21. The randomly oriented fibers 21C of the nonwoven fabric 20C have low engagement force, but offer superior cushioning and are capable of demonstrating sufficient protective abilities.

The relationship of the width W2 of the protective member 20 to the width W1 of the surface fastener is preferably such that 0.3≤W2/W1<1.0. This allows the protective member 20 to function effectively. If W2/W1 is less than 0.3, the protective effects of the protective member 20 will be insufficient; conversely, if W2/W1 is equal to or greater than 1.0, there is a risk of the protective member 20 sticking as a whole to the inner liner layer 7 on the inner surface 6 of the tire following the vulcanization step. The protective member 20 sticking to the inner liner layer 7 will not only make it more difficult to remove the protective member 20, but will also reduce the quality of the tire.

EXAMPLES

Tire size 215/60R16 pneumatic tires provided with surface fasteners on the inner surfaces of the tires were manufactured according to various manufacturing conditions.

In the working example, while a surface fastener provided with a plurality of first engaging elements and a sheet-shaped protective member provided with a plurality of second engaging elements that engage with the first engaging elements of the surface fastener were engaged with each other, the surface fastener was disposed in an unvulcanized tire so that a surface on a side opposite that of the surface on which the engaging elements were provided was closely fitted to an inner surface of the tire, and the unvulcanized tire with surface fastener was vulcanized using a vulcanizer equipped with a vulcanization bladder. The surface fastener was provided with a plurality of anchoring elements on a surface on a side opposite that of the surface on which the engaging elements were provided, and the anchoring elements were caused to dig into the inner surface of the tire when the surface fastener was disposed in the unvulcanized tire.

For a conventional example, a pneumatic tire with surface fastener was manufactured under conditions identical to those described above, except that a protective member was not used.

For the comparative example, the spaces between the engaging elements of the surface fastener were filled with unvulcanized rubber to form a protective rubber layer in which the engaging elements were embedded, the surface fastener provided with protective rubber layer was disposed in an unvulcanized tire so that a surface on a side opposite that of the surface on which the engaging elements are provided fit closely to the inner surface of the tire, and the unvulcanized tire with surface fastener was vulcanized using a vulcanizer equipped with a vulcanization bladder. The surface fastener was provided with a plurality of anchoring elements on a surface on a side opposite that of the surface on which the engaging elements were provided, and the anchoring elements were caused to dig into the inner surface of the tire when the surface fastener was disposed in the unvulcanized tire.

Pneumatic tires obtained according to these three different manufacturing methods were evaluated for surface fastener engagement force. To measure surface fastener engagement force, another surface fastener forming a pair with the surface fastener disposed on the inner surface of the tire was prepared, and "debonding strength" as defined in JIS-L 3416 was measured and expressed as an index giving an index of 100 to the conventional example. The higher the index value is, the greater the engagement force was.

TABLE 1

|  | Conventional Example | Working Example | Comparative Example |
| --- | --- | --- | --- |
| Protective member provided with engaging elements present? | No | Yes | No |
| Protective rubber layer present? | No | No | Yes |
| Engagement force (index) | 100 | 160 | 130 |

As shown in Table 1, the pneumatic tires obtained according to the manufacturing method of the working examples exhibited a dramatic increase in surface fastener engagement force over the conventional example. The pneumatic tire obtained according to the manufacturing method of the comparative example exhibited surface fastener engagement force that was greater than in the conventional example, but less than in the working examples.

What is claimed is:

1. A method of manufacturing a pneumatic tire with a surface fastener, the surface fastener comprising a plurality of first engaging elements, the method comprising:
   engaging a plurality of second engaging elements of a sheet-shaped protective member with the first engaging elements of the surface fastener to attach the protective member to the surface fastener;
   disposing the surface fastener in an unvulcanized tire so that a surface on a side opposite that of a surface on which the first engaging elements are provided is closely fitted to an inner surface of the tire;
   causing a plurality of anchoring elements to dig into the inner surface of the tire upon the disposing of the surface fastener in the unvulcanized tire, wherein the surface fastener comprises the anchoring elements on the surface on the side opposite that of the surface on which the first engaging elements are provided; and vulcanizing the unvulcanized tire comprising the surface fastener using a vulcanizer equipped with a vulcanization bladder; wherein the first engaging elements of the surface fastener are hooks and the protective member is a fabric comprising fibers as the second engaging elements;

a relationship of a width W2 of the protective member to a width W1 of the surface fastener is such that $0.3 \leq W2/W1 < 1.0$; and the surface fastener and the protective member have a post-vulcanization engagement force of 20 g/cm to 400 g/cm, the post-vulcanization engagement force being a force for separating the surface fastener and the protective member.

2. The method of manufacturing the pneumatic tire with the surface fastener according to claim 1, the method comprising disposing the surface fastener with the protective member on the inner surface of the tire after the surface fastener and the protective member are engaged with each other.

3. The method of manufacturing the pneumatic tire with the surface fastener according to claim 1, the method comprising engaging the protective member with the surface fastener after the disposing of the surface fastener on the inner surface of the tire.

4. The method of manufacturing the pneumatic tire with the surface fastener according to claim 1, wherein the protective member is a woven fabric comprising fiber loops as the second engaging elements, a knitted fabric comprising fiber loops as the second engaging elements, or a nonwoven fabric comprising randomly oriented fibers as the second engaging elements.

5. The method of manufacturing the pneumatic tire with the surface fastener according to claim 1, the method comprising removing the protective member from the surface fastener following the vulcanizing.

6. A pneumatic tire with surface fastener obtained according to the method of manufacturing described in claim 1, wherein the protective member is in a state of being attached to the surface fastener.

7. The method of manufacturing the pneumatic tire with the surface fastener according to claim 1, wherein regions in which no engaging elements are formed are provided at both ends of the surface fastener with respect to the widthwise direction of the tire.

8. The method of manufacturing the pneumatic tire with the surface fastener according to claim 1, wherein the surface fastener comprises anchoring elements on the surface on the side opposite that of the surface on which the first engaging elements are provided, the method further comprising:

applying an adhesive rubber layer onto the surface on the side opposite that of the surface on which the first engaging elements are provided in advance of disposing the surface fastener in the unvulcanized tire so that the anchoring elements are embedded in the adhesive rubber layer.

9. The method of manufacturing the pneumatic tire with the surface fastener according to claim 1, wherein $W2/W1 < 0.9$.

* * * * *